H. F. LICHTY.
CIGAR TIP CUTTER AND LIGHTER.
APPLICATION FILED AUG. 16, 1909.

964,171.

Patented July 12, 1910.

2 SHEETS—SHEET 1.

Inventor
Howard F. Lichty.

Witnesses

By C. A. Snow & Co.
Attorneys

H. F. LICHTY.
CIGAR TIP CUTTER AND LIGHTER.
APPLICATION FILED AUG. 16, 1909.
964,171.
Patented July 12, 1910.
2 SHEETS—SHEET 2.
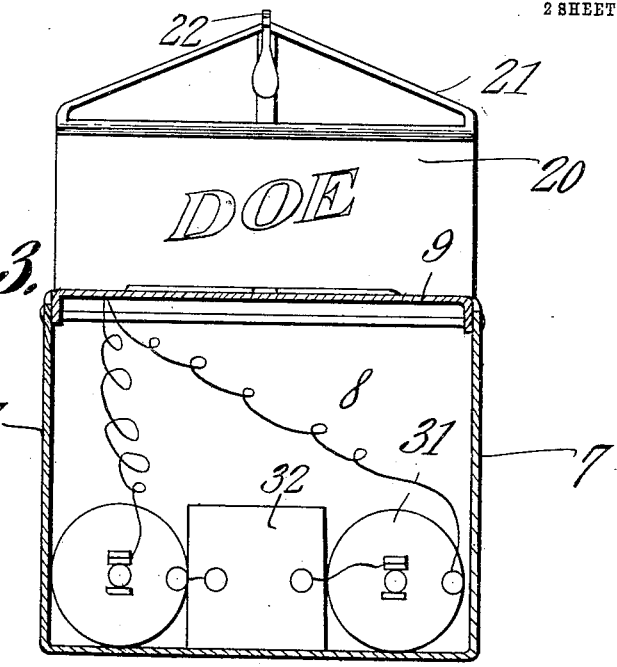
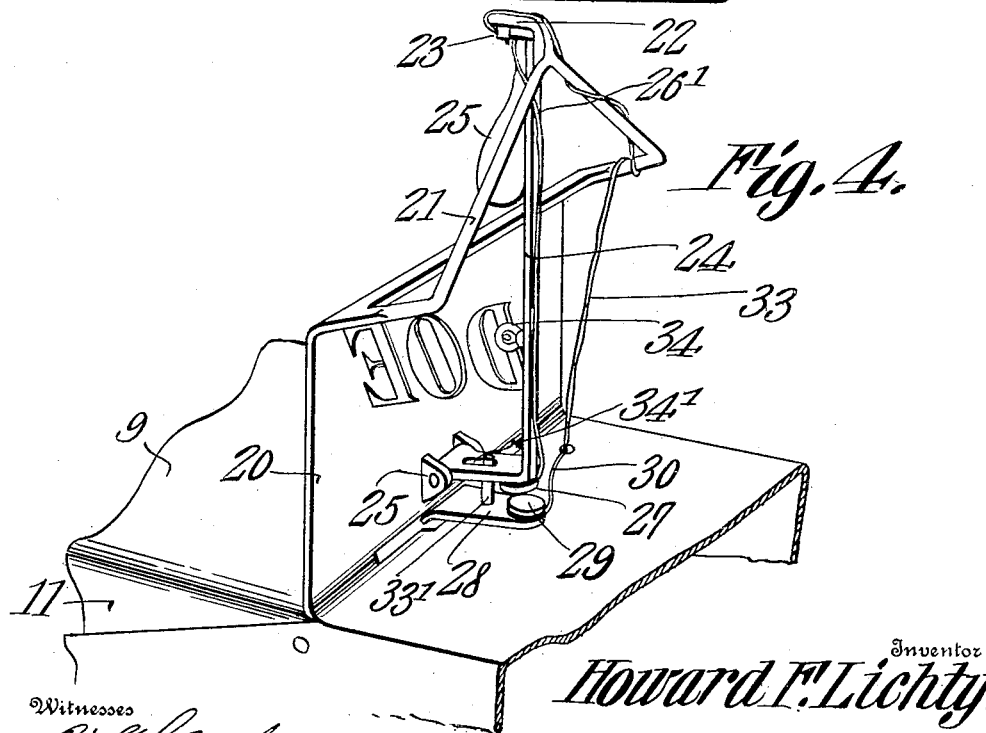
Witnesses
Inventor
Howard F. Lichty.
By C. A. Snow & Co.
Attorneys

UNITED STATES PATENT OFFICE.

HOWARD F. LICHTY, OF CRESTON, IOWA.

CIGAR TIP-CUTTER AND LIGHTER.

964,171.  Specification of Letters Patent.  Patented July 12, 1910.

Application filed August 16, 1909. Serial No. 513,059.

*To all whom it may concern:*

Be it known that I, HOWARD F. LICHTY, a citizen of the United States, residing at Creston, in the county of Union and State of Iowa, have invented a new and useful Cigar Tip-Cutter and Lighter, of which the following is a specification.

It is the object of the present invention to provide an improved construction of cigar-tip cutter and lighter, and the invention aims, primarily, to provide a device of this class so constructed that the cigar-igniting lamp will be automatically advanced at the time of the cutting of the cigar-tip.

It is a further aim of the invention to provide, in a device of this class, an arrangement of parts whereby the cigar-igniting lamp will be automatically lighted and advanced at the time the cigar is cut.

It is a further object of the invention to provide, in a device of this class, a novel advertising medium which will be illuminated, automatically, upon actuation of the cigar-tip cutting mechanism.

With the above and other objects in view, the invention resides in the construction and arrangement of parts illustrated in the accompanying drawings, in which:—

Figure 1:
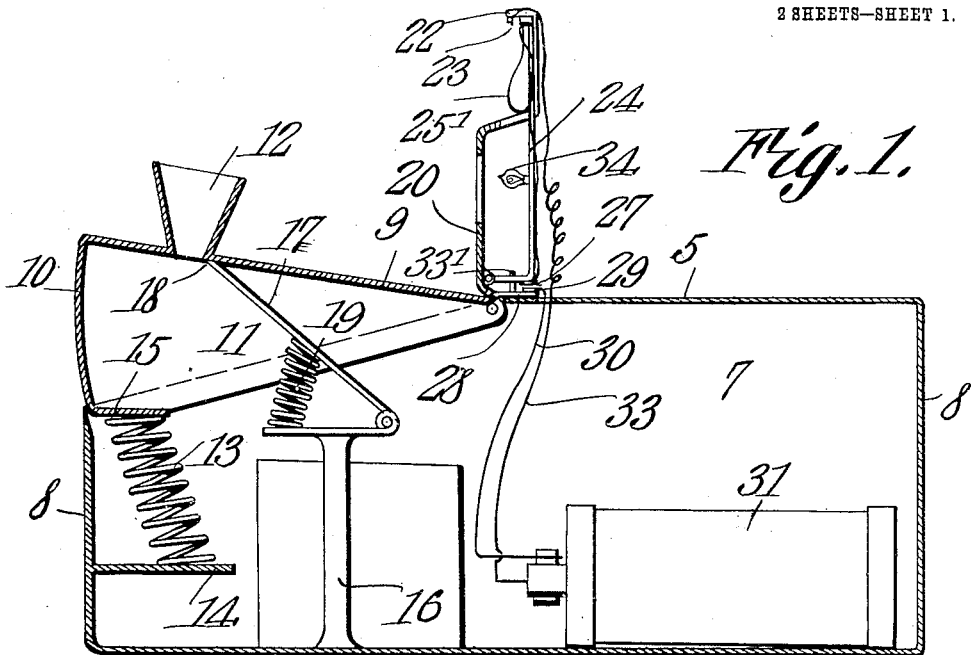
Figure 2:
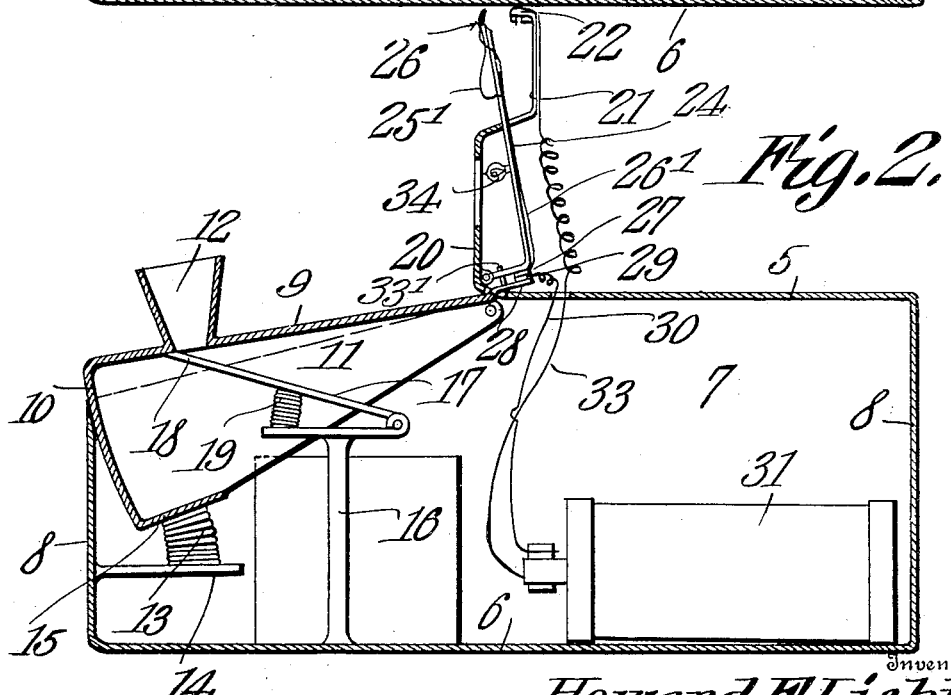

Figure 1 is a vertical longitudinal sectional view through the device, showing the same in normal condition. Fig. 2 is a similar view, but showing the device in condition when operated. Fig. 3 is a vertical transverse sectional view, taken in advance of the cigar-igniting device and the advertising medium. Fig. 4 is a detail perspective view of the cigar-igniting mechanism and the advertising medium.

In the drawings, the device embodying the present invention is illustrated as embodying a casing having a top wall 5, a bottom wall 6, side walls 7, and front and rear end walls 8. As illustrated in Figs. 1 and 2 of the drawings, the upper portions of the side walls 7, at their forward ends are cut away at an angle, and the corresponding portion of the top wall 5 is similarly cut away, as is also the upper portion of the front end wall 8, and there is hingedly mounted within the opening afforded by cutting away these walls, a casing section having a top wall 9, a convex front wall 10, and side walls 11.

A cigar end-receiving hopper or mouth 12 is formed or fixed upon the top wall 9 of the casing section just described, and opens at its lower end through the said top wall, and a spring 13 is supported upon a ledge 14 upon the forward end wall 8 of the casing of the device, and bears, at its upper end, against an inwardly directed extension or flange 15 at the lower edge of the forward wall 10 of the casing section previously described, it being understood that this spring exerts a normal tendency to hold the said casing section elevated, or in other words, in substantially the position shown in full lines in Fig. 1 of the drawings.

A standard 16 is arranged upon the bottom wall 6 of the casing of the device, and, at its upper end, has hingedly connected therewith the shank 17 of a cigar-tip cutting blade 18, there being a spring 19 interposed between the upper end of the standard 16 and the said shank 17 of the cigar-tip cutting blade, whereby to normally hold the cutting edge of this blade against the under side of the top wall 9 of the hinged casing section, the said edge of this blade being normally directly rearwardly of the lower end of the hopper 12, as shown in Fig. 1 of the drawings, although it sweeps across the lower end of the said hopper and moves to about the position shown in Fig. 2 of the drawings when the casing section is depressed, such movement serving to sever the tip of a cigar disposed tip-end first in the hopper or mouth 12.

As heretofore stated, means is provided for igniting a cigar cut by the device, and said igniting means is advanced at the time the cigar-tip is severed, it being automatically lighted at the same time, and such means will now be described.

A sign panel 20 is fixed upon the top wall 5 of the casing of the device and projects vertically thereabove, and this panel has upwardly and rearwardly projecting arms 21 which converge and are united to form a forwardly extending contact-supporting arm, indicated by the numeral 22, said arm carrying a spring-pressed contact 23. An arm 24 is pivoted at its lower end as at 25 to the rear end of this sign panel 20 and projects upwardly therefrom with its upper end in advance of the contact-supporting arm 22, at its point of junction with the arm 21. At its upper end the arm 24 carries a cigar-lighting lamp 25′, which may be of any desired form or construction, and which has assembled therewith a contact indicated by the numeral 26. A wire 26′ leads from this contact 26 to a contact disk 27 at the lower end of the arm 24, the upright having a right angularly bent lower end, as clearly shown in Figs. 1, 2 and 4 of the drawings, and having its contact disk 27 arranged at the bend. At its rear edge the casing section previously described is formed with a rearwardly projecting tongue 28, which extends above the top wall 5 of the casing, and which carries a contact disk 29. A wire 30 leads from this contact disk 29 to one pole of a battery 31, having associated therewith an induction coil 32. A wire 33 leads from the contact 23 at the end of the arm 22 to the other pole of the battery 31.

Normally, the two contact disks 27 and 29 are out of contact, as illustrated in Figs. 1 and 4 of the drawings, and, at such times, the upper end of the arm 24 rests in the bend of the arm 22. Upon depressing the casing section, at the time of severing a cigar-tip, the tongue 28 of the casing section will be swung upwardly, bringing the contact disk 29 into contact with the disk 27, thereby closing the circuit in which these and the contacts 23 and 26 are located, and further movement of this tongue 28 in an upward direction will serve to swing the arm 24 forwardly, the two contacts 23 and 26, upon separation, being bridged by a spark, which ignites the lamp 25'. Such forward swinging movement of the arm 24 will bring the lamp 25' within convenient reach of the operator of the device, as will be readily understood. The tongue 28 is formed with an upstanding pin 33' which projects through a slot 34' in the angularly bent lower end of the arm 22 and engages with one end of this slot when the casing section is released or returned to normal position, and acts to bring the arm to upright or normal position.

As heretofore stated, the panel 20 serves as an advertising medium, and may be partly transparent, and an electric bulb 34 may be mounted upon the arm 24 and be in circuit with the battery 31, whereby it will be caused to glow when the casing section is depressed. It will further be understood that inasmuch as the contact disks 27 and 29 are normally out of contact, whereby to break the circuit in which the battery 31 and induction coil 32 are interposed, the life of said battery will be considerably prolonged.

What is claimed is:—

In a device of the class described, a relatively fixed contact, a pivoted lamp supporting standard carrying a contact for coöperation with the first mentioned contact, a movable operating member for communicating motion to said standard, coöperating contacts carried by the standard and said operating member, means normally holding the operating member with the last mentioned contacts separated, and an electric circuit including all of said contacts.

In testimony that I claim the foregoing as my own, I have hereto affixed my signature in the presence of two witnesses.

HOWARD F. LICHTY.

Witnesses:
C. W. CARROLL,
E. L. CARROLL.